United States Patent [19]

Huang et al.

[11] Patent Number: 5,540,309
[45] Date of Patent: Jul. 30, 1996

[54] HYDRAULIC CYLINDER SEALING STRUCTURE

[75] Inventors: Zhen Huang, Wuppertal; Klaus Schmidt, Bergisch Gladbach; Hans Scheerer, Esslingen; Andreas Opara, Fellbach, all of Germany

[73] Assignees: August Bilstein GmbH & Co KG, Ennepetal; Mercedes-Benz AG, Stuttgart, both of Germany

[21] Appl. No.: 355,642

[22] Filed: Dec. 14, 1994

[30] Foreign Application Priority Data

Dec. 16, 1993 [DE] Germany ............................ 43 42 883.5

[51] Int. Cl.⁶ ........................... B60G 17/08; B60G 13/08; F16F 9/46
[52] U.S. Cl. ................... 188/322.16; 188/299; 285/138; 285/382.4
[58] Field of Search ..................... 188/284, 286, 188/299, 315, 316, 318, 319, 322.16, 322.18, 322.19; 403/272, 282, 288; 285/133.1, 138, 382.4, 382.5

[56] References Cited

U.S. PATENT DOCUMENTS

| | | | |
|---|---|---|---|
| 3,370,870 | 2/1968 | Mahoff | 285/382.5 X |
| 4,960,188 | 10/1990 | Wossner | 188/299 |
| 5,375,683 | 12/1994 | Huang et al. | 188/299 |

FOREIGN PATENT DOCUMENTS 9309966  5/1993  WIPO ..................... 188/299

Primary Examiner—Josie Ballato
Attorney, Agent, or Firm—Max Fogiel

[57] ABSTRACT

A regulable hydraulic dashpot for motor vehicles with a shock-absorption piston equipped with pressure-sensitive throttle valves traveling back and forth on the end of a piston rod inside a shock-absorption cylinder full of shock-absorbing fluid and dividing the cylinder into two displacement chambers. A gas-filled pressure-compensation chamber operates in conjunction with one displacement chamber. A shock-absorption performance-curve selection valve is positioned outside the cylinder and opens and closes a bypass. To create a hydraulic-fluid channel, the cylinder comprises two parts of different width between the two displacement chambers. One of the parts overlaps the other to the length of the stroke traveled by the piston and its open end is sealed tight to the outer part. The outer part is provided with two hydraulic-fluid conveying connections into the shock-absorption performance-curve selection valve. The parts of the cylinder between the connections are sealed off from each other by a sealing component.

9 Claims, 3 Drawing Sheets

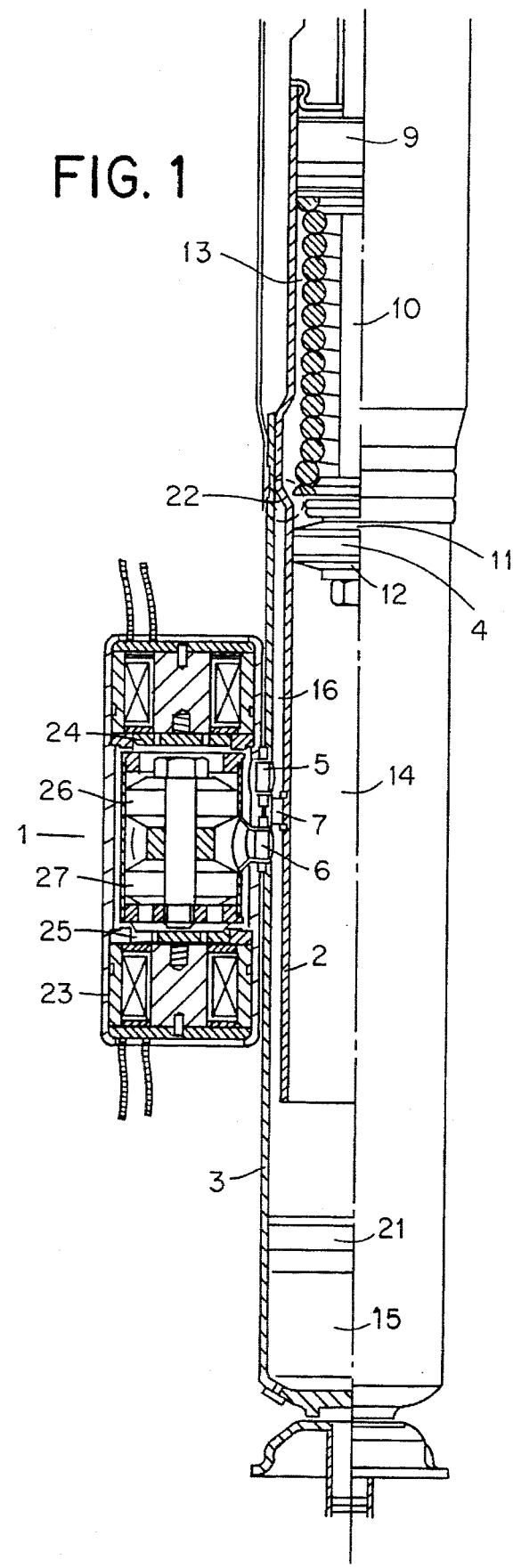

FIG. 2c
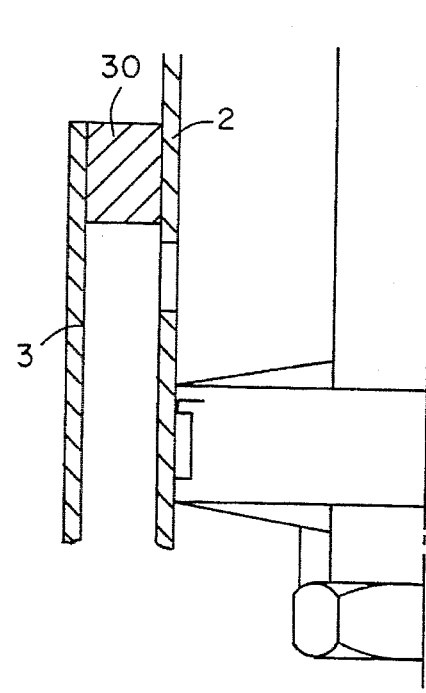
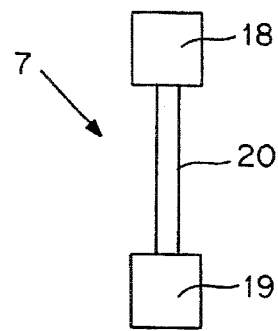
FIG. 3

5,540,309

HYDRAULIC CYLINDER SEALING STRUCTURE

BACKGROUND OF THE INVENTION

The present invention concerns a regulable hydraulic dashpot for motor vehicles.

German OS 4 041 829 A1 discloses a regulable single-cylinder dashpot. A valve on the wall of the shock-absorption cylinder allows multiple-level adjustment of the shock-absorption force by way of a bypass around a throttle valve on the shock-absorption piston. The bypass is a cylindrical component mounted on the cylinder or integrated into it in the form of an extruded section. The bypass is sealed off between its two hydraulic-fluid conveying connections. Each fluid-conveying connection communicates with one of the displacement chambers inside the dashpot.

Another approach to establishing a bypass that communicates with the chambers is known from German OS 3 831 718 A1. The shock-absorption cylinder is accommodated in a cylindrical container. The end of the cylinder that accommodates the gas chamber rests tight against it. A piston-rod centering cap is mounted over both at the other end. The resulting hydraulic-fluid channel around the cylinder and between the chambers is divided into an upper and a lower influent channel. A shock-absorption performance-curve selection valve provides communication between one of the hydraulic-fluid conveying connections and the upper influent channel and between the other hydraulic-fluid conveying connection and the lower influent channel. Since the fluid channel is demarcated by a double-walled cylinder, the gas-filled pressure-compensation can be smaller or the overall dashpot wider.

German GM 9 210 834 describes a regulable single-cylinder dashpot with a shock-absorption performance-curve selection valve mounted on the cylinder. The cylinder is divided into two parts, leaving a bypass between the displacement chambers. One part includes a narrower section as long as the length of the stroke traveled by the piston. The other part overlaps the narrower section. The ends of the cylinder's parts are open and the two parts are sealed off from each other. The shock-absorption performance-curve selection valve is mounted on the cylinder such that one hydraulic-fluid conveying connection communicates with an annular hydraulic-fluid channel that communicates in turn with the upper displacement chamber and the other fluid-conveying connection opens directly into the lower displacement chamber.

Such a shock-absorption cylinder has several joints that must be welded or soldered and is accordingly complicated to manufacture. Another drawback is that the design of the hydraulic-fluid channel dictates the position of the shock-absorption performance-curve selection valve hydraulic-fluid conveying connections and accordingly the axial position of the valve and allows no variability.

SUMMARY OF THE INVENTION

The object of the present invention is accordingly a dashpot with a performance-curve selection valve mounted on the shock-absorption cylinder that will be simple to manufacture, whereby the axial position of the valve on the cylinder can be extensively varied to conform with the available space inside the vehicle.

To establish a hydraulic-fluid channel between the two displacement chambers in the dashpot in accordance with the present invention accordingly, the shock-absorption cylinder comprises two parts of different width. The wider part overlaps the narrower part by at least the length of the stroke traveled by the piston and its open end is sealed tight against the narrower part. The outer part also accommodates hydraulic-fluid conveying connections to the shock-absorption performance-curve selection valve. The two parts of the cylinder are mutually sealed off by a sealing component between the hydraulic-fluid conveying connections.

The part of the cylinder that accommodates the sealed piston-rod centering cap in one preferred embodiment of the invention overlaps the part of the cylinder that accommodates the gas-filled pressure-compensation chamber. The essential advantage of this type of cylinder is a larger pressure-compensation chamber with no increase in the dashpot's outer width.

The seal between the two parts of the cylinder is established in one advantageous characteristic of the invention in that the inner part of the cylinder has a wider section that the outer part rests tight against. This can be attained with a continuous soldered or welded joint or by expanding the edge of the outer part and inserting an O ring. The port between the hydraulic-fluid channel and the upper displacement chamber is preferably positioned in the slanting area of the expansion, preventing damage to the piston ring.

Radial support for the inner part of the cylinder is preferably achieved with a sealing component between the hydraulic-fluid conveying connections in the shock-absorption performance-curve selection valve.

The particular advantages of the present invention are a wide range of potential positions for mounting the performance-curve selection valve along the shock-absorption cylinder and simple and unproblematic positioning of the dashpot.

BRIEF DESCRIPTION OF THE DRAWINGS

Several embodiments of the invention will now be described by way of example with reference to the accompanying drawing, wherein FIG. 1 is a single-cylinder dashpot with a four-way shock-absorption performance-curve selection valve and FIGS. 2a though 2c are sections through the shock-absorption cylinder in the vicinity of the joint between its two parts.

FIG. 3 is a sectional view of the sealing component of FIG. 1.

DESCRIPTION OF THE PREFERRED EMBODIMENTS

Figure 2A:
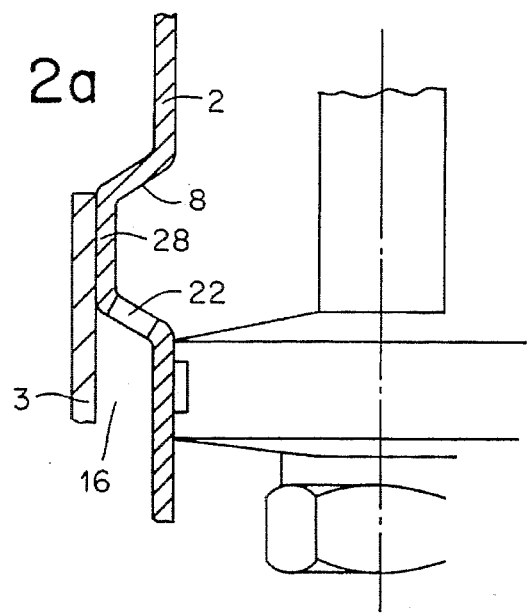

The regulable single-cylinder dashpot illustrated in FIG. 1 consists essentially of a shock-absorption cylinder and of a shock-absorption piston 4. Piston 4 is equipped with throttle valves 11 and 12 and travels back and forth inside the cylinder on the end of a piston rod 10. Piston rod 10 extends tight through a centering cap 9. Piston 4 separates the fluid-filled shock-absorption cylinder into two displacement chambers 13 and 14. A partitioning piston 21 floats inside the cylinder and separates displacement chamber 14 from a pressure-compensation chamber 15, allowing the fluid to yield to the entering piston rod 10.

A shock-absorption performance-curve selection valve 1 is mounted on the cylinder. Valve 1 opens and closes a bypass around the throttle valves 11 and 12. To establish the bypass the shock-absorption cylinder consists of two parts 2 and 3, and the part 3 of the cylinder that accommodates pressure-compensation chamber 15 is wider and overlaps cylinder part 2 to the length of the stroke traveled by piston 4, with its open end sealed tight to part 2. The gap between parts 2 and 3 constitutes, up to a sealing component 7, a hydraulic-fluid channel 16 through the bypass. The gap communicates with displacement chamber 13 by way of a port 22 and with valve 1 by way of a hydraulic-fluid conveying connection 5. Another hydraulic-fluid conveying connection 6 in valve 1 opens into a section of the gap that communicates with displacement chamber 14. Performance-curve selection valve 1 is flanged to part 3 of the cylinder and consists essentially of two mutually coaxial electromagnetically actuated bolts 24 and 25 that slide back and forth in a housing 23 and of two pressure-sensitive valves 26 and 27 downstream of the bolts. Valve 1 selects in conjunction with the throttle valves 11 and 12 on piston 4 one of four shock-absorption performance curves with the dashpot in either the suction or the compression stage.

Part 3 of the cylinder that accommodates the pressure-compensation chamber 15, overlaps part 2.

Figure 2B:
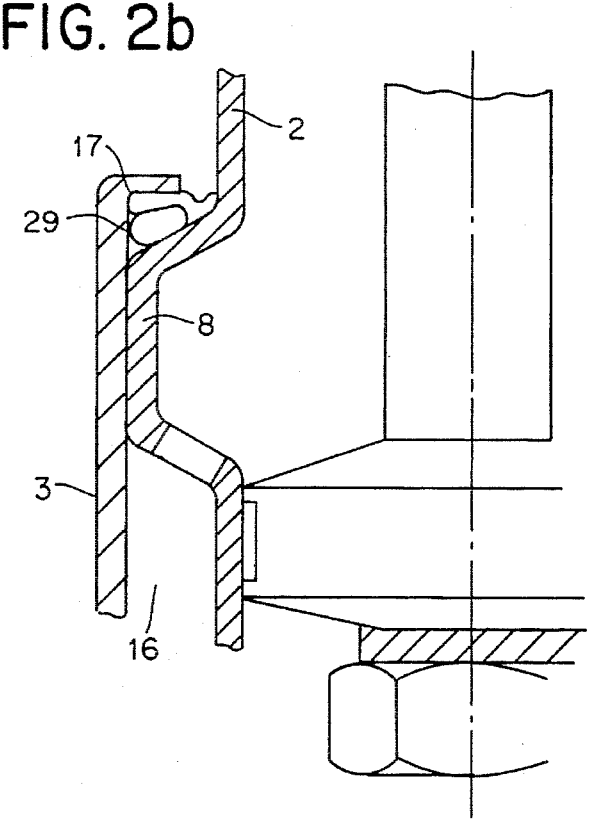

FIGS. 2a through 2c illustrate different ways of sealing part 3 to part 2 by said sealing component 7. The end of the hydraulic-fluid channel 16 in the part 2 illustrated in FIG. 2a is surrounded by an expansion 8. Part 3 of the cylinder is soldered or welded all the way around to the surface 28 of expansion 8, sealing hydraulic-fluid channel 16 off from outside. The slanting surface of expansion 8 is simultaneously exploited to provide at least one port 22 for communicating with the channel.

The edge 17 of the part 3 illustrated in FIG. 2b is flanged around the expansion 8 of part 2. Hydraulic-fluid channel 16 is sealed between flanged edge 17 and expansion 8 with an O ring 29.

There is an annular spacer 30 between the parts 2 and 3 in the embodiment illustrated in FIG. 2c and welded or soldered to each part.

In summary the present invention provides a regulable hydraulic dashpot for motor vehicles in which a shock-absorption piston 4 is equipped with pressure-sensitive throttle valves 11 and 12. These valves travel back and forth in a stroke on an end of a piston rod 10 inside the shock-absorption cylinder. This cylinder is filled with shock-absorbing fluid, and is divided into two displacement chambers. A gas-filled pressure-compensation chamber 15 operates in conjunction with one of the displacement chambers 14. A shock-absorption performance-curve selection valve 1 is positioned outside the cylinder and opens and closes a bypass. The cylinder has two parts 2 and 3 of different widths around the two displacement chambers to create a hydraulic-fluid channel 16. One of the two parts overlap the other part to a length of the stroke travelled by the piston, and an open end 17 of that one part is sealed tight with respect to the other part. One of the two parts, furthermore, is an outer part that is provided with two hydraulic-fluid conveying connections 5 and 6 leading into the shock-absorption performance-curve selection valve. The parts of the cylinder between the connections are sealed off from each other by a sealing component 7.

The outer part, furthermore, rests against the inner part through the sealing component 7. One of the parts of the cylinder, moreover, accommodates the pressure-compensation chamber 15 and overlaps the other part. The inner part has an expansion 8 thereabout. A port 22 is located between the hydraulic fluid channel 16 and one of the piston-displacement chambers 13, and in a sloping surface of the expansion 8. The outer part of the cylinder has that open end with a narrower section where that open end is sealed to the inner part. The sealing component 7 has at least one spacer 18, 19 and an annular seal 20.

We claim:

1. A regulable hydraulic dashpot for motor vehicles comprising: a shock-absorption piston having pressure-sensitive throttle valves, a shock-absorption cylinder filled with shock-absorbing fluid; a piston rod with an end inside said cylinder and dividing said cylinder into two displacement chambers, said throttle valves traveling back and forth in a stroke on said end of said piston rod inside said cylinder; a gas-filled pressure-compensation chamber operating in conjunction with one of said displacement chambers; a shock-absorption performance-curve selection valve positioned outside said cylinder and opening and closing a bypass; said cylinder comprising two parts of different widths around said two displacement chambers to create a hydraulic-fluid channel, one of said two parts overlapping the other part to a length of said stroke traveled by said piston, said one part having an open end sealed tight to the other part, said two parts of said cylinder comprising an outer part and an inner part, said outer part having two hydraulic-fluid conveying connections leading into said shock-absorption performance-curve selection valve; a sealing component, said parts of said cylinder being between said connections and being sealed off from each other by said sealing component.

2. A dashpot as defined in claim 1, wherein said outer part rests against said inner part through said sealing component.

3. A dashpot as defined in claim 1, wherein said outer part of said cylinder accommodates said pressure-compensation chamber and overlaps said inner part.

4. A dashpot as defined in claim 1, including an expansion around said inner part.

5. A dashpot as defined in claim 4, including a port between said hydraulic-fluid channel and one of said piston-displacement chambers and in a sloping surface of said expansion.

6. A dashpot as defined in claim 1, wherein said outer part of the cylinder has said open end with a narrower section where said open end is sealed to said inner part.

7. A dashpot as defined in claim 1, wherein said sealing component comprises at least one spacer and an annular seal.

8. A regulable hydraulic dashpot for motor vehicles comprising: a shock-absorption piston having pressure-sensitive throttle valves, a shock-absorption cylinder filled with shock-absorbing fluid; a piston rod with an end inside said cylinder and dividing said cylinder into two displacement chambers, said throttle valves traveling back and forth in a stroke on said end of said piston rod inside said cylinder; a gas-filled pressure-compensation chamber operating in conjunction with one of said displacement chambers; a shock-absorption performance-curve selection valve positioned outside said cylinder an opening and closing a bypass; said cylinder comprising two parts of different widths around said two displacement chambers to create a hydraulic-fluid channel, one of said two parts overlapping the other part to a length of said stroke traveled by said piston, said one part having an open end sealed tight to the other part, said two parts of said cylinder comprising an outer part and an inner part, said outer part having two hydraulic-fluid conveying connections leading into said shock-absorption performance-curve selection valve; a sealing component, said parts of said cylinder being between said connections and being sealed off from each other by said sealing component; an expansion around said inner part.

9. A regulable hydraulic dashpot for motor vehicles comprising: a shock-absorption piston having pressure-sensitive throttle valves, a shock-absorption cylinder filled with shock-absorbing fluid; a piston rod with an end inside said cylinder and dividing said cylinder into two displacement chambers, said throttle valves traveling back and forth in a stroke on said end of said piston rod inside said cylinder; a gas-filled pressure-compensation chamber operating in conjunction with one of said displacement chambers; a shock-absorption performance-curve selection valve positioned outside said cylinder and opening and closing a bypass; said cylinder comprising two parts of different widths around said two displacement chambers to create a hydraulic-fluid channel, one of said two parts overlapping the other part to a length of said stroke traveled by said piston, said one part having an open end sealed tight to the other part, said two parts of said cylinder comprising an outer part and an inner part, said outer part having two hydraulic-fluid conveying connections leading into said shock-absorption performance-curve selection valve; a sealing component, said parts of said cylinder being between said connections and being sealed off from each other by said sealing component, said outer part resting against said inner part through said sealing component, said outer part of said cylinder accommodating said pressure-compensation chamber and overlapping said inner part.

\* \* \* \* \*